United States Patent
Taguchi

(10) Patent No.: US 11,020,806 B2
(45) Date of Patent: Jun. 1, 2021

(54) TOOL REST FOR MACHINE TOOL

(71) Applicants: CITIZEN WATCH CO., LTD., Nishitokyo (JP); CITIZEN MACHINERY CO., LTD., Nagano (JP)

(72) Inventor: Noriyoshi Taguchi, Tokorozawa (JP)

(73) Assignees: CITIZEN WATCH CO., LTD., Nishitokyo (JP); CITIZEN MACHINERY CO., LTD., Nagano (JP)

(*) Notice: Subject to any disclaimer, the term of this patent is extended or adjusted under 35 U.S.C. 154(b) by 0 days.

(21) Appl. No.: 16/613,121

(22) PCT Filed: Jun. 1, 2018

(86) PCT No.: PCT/JP2018/021276
§ 371 (c)(1),
(2) Date: Nov. 13, 2019

(87) PCT Pub. No.: WO2019/003803
PCT Pub. Date: Jan. 3, 2019

(65) Prior Publication Data
US 2020/0108450 A1 Apr. 9, 2020

(30) Foreign Application Priority Data
Jun. 29, 2017 (JP) .............................. JP2017-127788

(51) Int. Cl.
*B23B 29/24* (2006.01)
*B23B 29/32* (2006.01)
(Continued)

(52) U.S. Cl.
CPC ............ *B23B 29/24* (2013.01); *B23B 29/323* (2013.01); *B23Q 5/04* (2013.01); *B23Q 5/56* (2013.01);
(Continued)

(58) Field of Classification Search
CPC . B23B 29/24; B23B 29/323; B23Q 2220/002; Y10T 29/5154; Y10T 29/5155;
(Continued)

(56) References Cited

U.S. PATENT DOCUMENTS 4,087,890 A * 5/1978 Ishizuka ............... B23B 13/126
29/27 C
4,656,708 A * 4/1987 Smith ...................... B23Q 1/54
29/39
(Continued)

FOREIGN PATENT DOCUMENTS

DE 202013101913 U1 * 5/2013 ............... B23Q 5/02
EP 1992435 A1 * 11/2008 ........... B23Q 16/008
(Continued)

OTHER PUBLICATIONS

EPO Machine Translation of JP 2006150574 A—Kushida, Toshihiko; "Lathe turning machine tool has clamp apparatuses attached to tool holder attachment surface of turret, that clamp tool holders for performing front-side processing and rear"; Jun. 15, 2006.*
(Continued)

*Primary Examiner* — Erica E Cadugan
*Assistant Examiner* — Michael Vitale
(74) *Attorney, Agent, or Firm* — Kenja IP Law PC

(57) ABSTRACT

A tool rest for a machine tool, with a plurality of rotary tools and a tool-rotating drive shaft supported rotatably so that its rotation is transmitted to each rotary tool. The tool rest includes: a plurality of input portions fixed to the tool-rotating drive shaft; and engaging portions corresponding to the respective input portions, rotatably supported and adopted to be driven in rotation by the input portions for engaging with engaged portions of each rotary tool to transmit power when a prescribed rotational phase is reached. Adjusting means is provided between a prescribed
(Continued)

FIG. 1 input portion and the engaging portion, for adjusting the phase of the engaging portion relative to the tool-rotating drive shaft such that the engaging portions and the corresponding engaged portions are engaged simultaneously.

4 Claims, 3 Drawing Sheets

(51) Int. Cl.
     *B23Q 5/56*      (2006.01)
     *B23Q 5/04*      (2006.01)

(52) U.S. Cl.
     CPC ..... *B23Q 2220/002* (2013.01); *Y10T 29/5155* (2015.01); *Y10T 82/2587* (2015.01); *Y10T 408/37* (2015.01)

(58) Field of Classification Search
     CPC ............... Y10T 82/2587; Y10T 408/37; Y10T 409/307672; Y10T 409/308232
     USPC ............ 29/39, 40; 82/159; 408/35; 409/201, 409/211
     See application file for complete search history.

(56) References Cited

U.S. PATENT DOCUMENTS

| | | | | |
|---|---|---|---|---|
| 2003/0046799 | A1* | 3/2003 | Matsumoto | B23Q 16/025 29/39 |
| 2006/0064861 | A1* | 3/2006 | Ishiguro | B23Q 39/02 29/40 |
| 2017/0113313 | A1* | 4/2017 | Aoyagi | B23B 29/323 |

FOREIGN PATENT DOCUMENTS

| | | | | |
|---|---|---|---|---|
| GB | 2275631 | A * | 9/1994 | ........... B23B 29/323 |
| JP | H02100803 | A | 4/1990 | |
| JP | 02311204 | A * | 12/1990 | ............... B23Q 5/02 |
| JP | H07227704 | A | 8/1995 | |
| JP | H10291104 | A | 11/1998 | |
| JP | 2889426 | B2 | 5/1999 | |
| JP | 2003311501 | A * | 11/2003 | ........... B23B 29/323 |
| JP | 2006150574 | A | 6/2006 | |
| JP | 2007154930 | A | 6/2007 | |
| JP | 2016190283 | A | 11/2016 | |
| TW | 200618895 | A | 6/2006 | |
| WO | WO-2013161354 | A1 * | 10/2013 | ............. B23Q 5/045 |

OTHER PUBLICATIONS

EPO Machine Translation of JP 2007154930 A—Kanemitsu, M; "Biaxial output gear apparatus e.g. for power transmission gear for twin screw resin extruder"; Jun. 21, 2007.*

Aug. 28, 2018, International Search Report issued in the International Patent Application No. PCT/JP2018/021276.

Dec. 31, 2019, International Preliminary Report on Patentability issued in the International Patent Application No. PCT/JP2018/021276.

Jan. 29, 2021, Office Action issued by the Taiwan Intellectual Property Office in the corresponding Taiwanese Patent Application No. 107119712.

Jan. 5, 2021, Notification of Reasons for Refusal issued by the Japan Patent Office in the corresponding Japanese Patent Application No. 2017-127788.

Oct. 22, 2020, Office Action issued by the China National Intellectual Property Administration in the corresponding Chinese Patent Application No. 201880032338.1.

Apr. 6, 2021, Notification of Reasons for Refusal issued by the Japan Patent Office in the corresponding Japanese Patent Application No. 2017-127788.

Apr. 1, 2021, the Extended European Search Report issued by the European Patent Office in the corresponding European Patent Application No. 18823113.8.

* cited by examiner

TOOL REST FOR MACHINE TOOL

TECHNICAL FIELD

This disclosure relates to a tool rest for a machine tool.

BACKGROUND

As a tool rest for a machine tool, such as a turret lathe disclosed for example in Patent Literature PTL 1 (JPH 07227704 A), there is known a tool rest provided with a plurality of rotary tools wherein the rotation of a tool-rotating drive shaft is transmitted to each rotary tool.

Patent Literature PTL 2 (JP 2889426 B) discloses another tool rest in the form of a turret tool rest wherein the power transmission mechanism for transmitting rotation of the tool-rotating drive shaft to the rotary tool includes an input portion (bevel gear) fixedly secured to the tool-rotating drive shaft, as well as a clutch mechanism driven into rotation by the input portion and having an engaging portion engageable with the engaged portion of the rotary tool for transmitting power when a predetermined rotation phase is reached.

CITATION LIST

Patent Literature

PTL 1: JPH 07227704 A
PTL 2: JP 2889426 B

SUMMARY

Technical Problem

When, as disclosed in Patent Literature PTL 2, each rotary tool is transmitted with driving power via a power transmission mechanism having a clutch mechanism, there is a problem that simultaneous engagement of each engaging portion with each engaged portion is not easy.

The present disclosure has been achieved in view of the above-mentioned problem, and its object is to provide a tool rest of a machine tool, which is capable of easily achieving a simultaneous engagement of the respective engaging portions with the respectively corresponding engaged portions.

Solution to Problem

According to the present disclosure, there is provided a tool rest for a machine tool, with a plurality of rotary tools, and a rotatably supported tool-rotating drive shaft whose rotation is transmitted to each rotary tool. The tool rest comprises: a plurality of input portions fixed to the tool-rotating drive shaft; and engaging portions corresponding to the respective input portions, rotatably supported and adapted to be driven in rotation by the input portion for engaging with the respective engaged portions of the rotary tool when a prescribed angular phase is reached. Adjusting means is provided between a prescribed input portion and the engaging portion, for adjusting the phase of the engaging portion relative to the tool-rotating drive shaft such that the engaging portions and the corresponding engaged portions are engaged simultaneously.

The tool rest according to the present disclosure, with the constitution as described above, may be further provided a fixing means for fixing the input portions to the tool-rotating drive shaft, the fixing means being comprised of the adjusting means.

In the tool rest according to the present disclosure, with the constitution as described above, the input portion may be comprised of a gear wheel, wherein the phase of the engaging portion is adjusted relative to the tool-rotating drive shaft, by shifting the fixing position of the gear wheel to the tool-rotating drive shaft, in a rotating direction relative to the tool-rotating drive shaft.

The tool rest according to the present disclosure, with the constitution as described above, may be further provided with a rotatable tool-mounting portion for mounting the rotary tool thereon, wherein two rotary tools are mounted along a turning axis, and wherein the two rotary tools are adapted to be simultaneously indexed and driven for rotation by a prescribed indexing turning of the tool-mounting portion.

In the tool rest according to the present disclosure, with the constitution as described above, the engaging portion and the engaged portion may comprise a tenon and a mortise, respectively, wherein the tenon and the mortise are engageable by a turning of the tool-mounting portion.

Advantageous Effect

The present disclosure makes it possible to provide a tool rest of a machine tool, which is capable of easily achieving a simultaneous engagement of the respective engaging portions with the respectively corresponding engaged portions.

DETAILED DESCRIPTION

Figure 1:
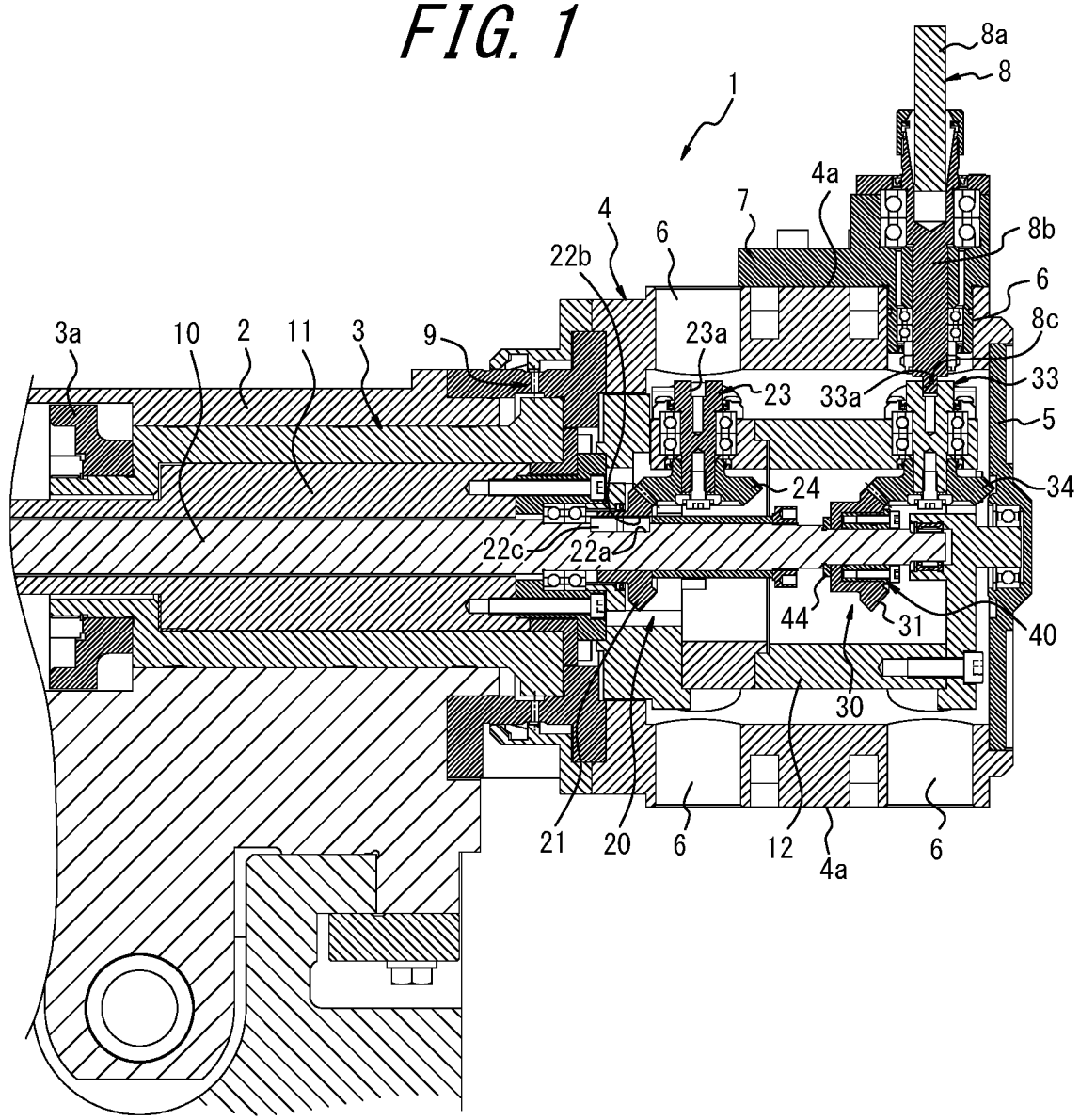
FIG. 1 is a sectional view illustrating the outline of a turret tool rest according to one embodiment of the present disclosure.

There is illustrated in FIG. 1 a turret tool rest (tool rest for a machine tool) 1, which is used, for example, in a machine tool, such as an NC lathe.

The turret tool rest 1 includes a turret 4 turnably (i.e., rotatably) supported by a support stand 2 by means of a turret-turning shaft 3. The turret 4, which is comprised, for example, of a steel material, is polygonal in shape having a plurality of turret faces 4a and fixed on one side coaxially to the turret-turning shaft 3. The turret 4 has a hollow interior, with a tip end opening on the other side, which is closed by a cover 5.

The turret-turning shaft 3 is connected to an indexing motor, not shown, through a gear 3a that is fixed on the proximal end side, such that the turning shaft 3 can be driven in rotation by means of the indexing motor.

Around the turret 4, there are provided a plurality of tool-mounting portions 6 on which the rotary tools may be mounted. In the illustrated embodiment, around the turret 4, twelve (12) turret faces 14 are each provided with two tool-mounting portions 6, i.e., twenty four (24) tool mounting portions 6 in total, which are arranged side by side in the axial direction (the direction along the turning axis) of the turret-turning shaft 3, in two stages arranged side by side in the axial direction of the turret-turning shaft 3. The twelve tool-mounting portions 6 arranged equidistantly in the circumferential direction on one side (right side in the figure) in the axial direction of the turret-turning shaft 3 are the tool mounting portions on the upper stage, while the twelve tool-mounting portions 6 arranged equidistantly in the circumferential direction on the other side (left side in the figure) in the axial direction of the turret turning shaft 3 are the tool mounting portions on the lower stage.

Each tool-mounting portion 6 is configured to have a through-hole extending radially through the turret 4. The tool-mounting portion 6 is adopted to mount thereon a rotary tool 8, such as a drill or an end mill, by means of a holder 7. The rotary tool 8 mounted on the tool-mounting portion 6 is rotatably supported by the holder 7, through a bearing, and can be rotated with the radial direction of the turret 4 as its rotary axis.

Figure 2:
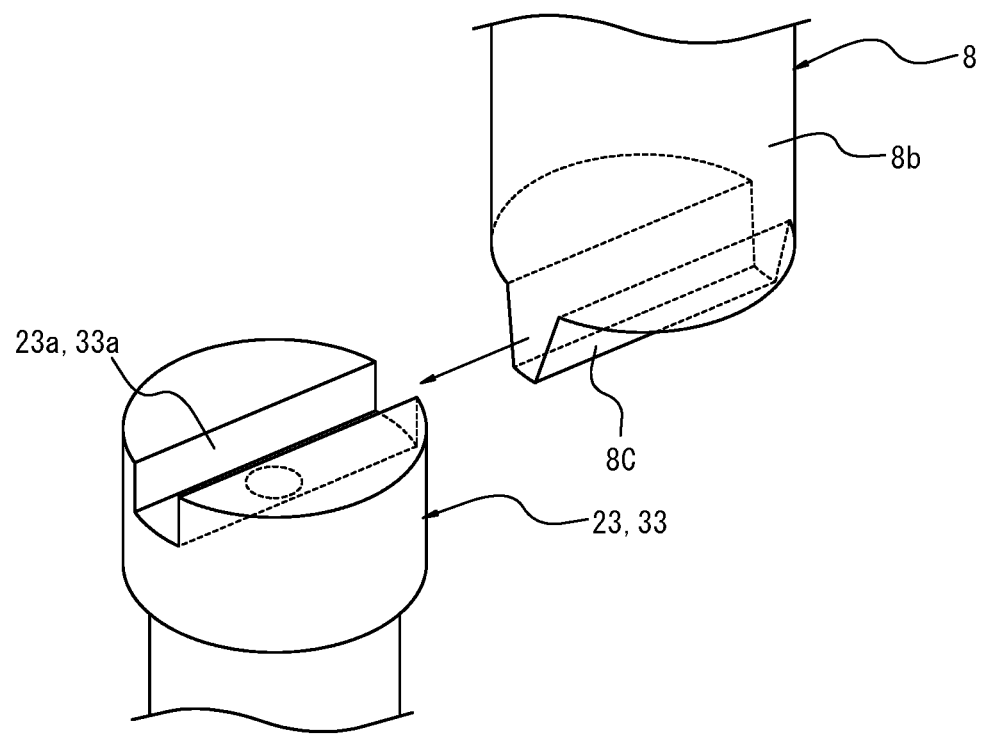
FIG. 2 is a view for explaining the engaging structure of the clutch mechanism illustrated in FIG. 1.

As the rotary tool 8 to be mounted on the tool-mounting portion 6, thee is used a tool including a tool main body 8a provided with cutting blades, as well as a shank 8b that is coaxial with the tool main body 8a, having a lower end surface integrally provided with an engaged portion in the form of a tenon 8c (see, FIG. 2) that extends in the radial direction.

While FIG. 1 shows a state in which one rotary tool 8 is mounted on an upper stage tool-mounting portion 6, the other tool-mounting portions 6, whether in the upper stage or the lower stage, may be mounted with rotary tools as necessary, such that the turret 4 is equipped with a plurality of rotary tools 8. The tool-mounting portion 6 may also be mounted with a non-rotating tool, such as a bite.

A coupling mechanism 9 is provided between the turret 4 and the support stand 2. The turret 4 can be locked by the coupling mechanism 9 and thereby positioned in a prescribed index position corresponding to each tool-mounting portion 6. The turret turning shaft 3 can be driven in the axial direction by means of a drive mechanism, not shown, to move the turret 4 in a direction away from the support stand 2 so as to disengage the coupling by the coupling mechanism. The turret-turning shaft 3 is then driven by an indexing motor, not shown, in rotation by a prescribed angle, before the coupling mechanism 9 is reengaged such that any tool-mounting portion 6 can be positioned selectively in a prescribed index position. For example, two rotary tools 8, which are mounted on two tool-mounting portions 6 in a juxtaposed relation along the turning axis, may be simultaneously indexed at the respective positions that can be driven in rotation, by means of a prescribed indexing turning. The machine tool is adapted to perform machining of a workpiece clamped by the main spindle, by means of a tool, such as a rotary tool 8 mounted on a tool-mounting portion 6 that has been positioned in the indexed position.

The coupling mechanism 9 is not limited to an arrangement wherein the engagement and disengagement is achieved by the drive mechanism for moving the turret 4 in the axial direction away from the support stand 2; there may also be used a mechanism (e.g., a three-piece coupling) wherein the engagement and disengagement can be achieved within the turret 4 without moving the turret 4 in the axial direction relative to the support stand 2

A tool-rotating drive shaft 10 is arranged on the axis of the turret-turning shaft 3. The tool-rotating drive shaft 10 is adapted to be driven in rotation by means of a tool-rotating motor, not shown. As the tool-rotating motor, there is used a motor with of a constitution that allows for a phase control of the stopping position (i.e., the angular position upon stopping) of the tool-rotating shaft 10, such as a servomotor, whereby the tool-rotating shaft 10 is stopped at a stopping position always with a prescribed stopping phase.

A cylindrical stationary shaft 11 is arranged between the turret-turning shaft 3 and the tool-rotating drive shaft 10 and is non-rotatably supported by the support stand 2, while a casing-like stationary body 12 is fixed to the tip end of the stationary shaft 11. The stationary body 12 is supported by the support stand 2 through the stationary shaft 11 and is non-rotatably arranged inside the turret 4 regardless of the turning of the turret 4. The cover 5 fixed to the turret 4 is rotatably supported on the fixed body 12 by a bearing.

The turret 4 is provided with a lower stage power transmission mechanism 20 for transmitting the rotation of the tool-rotating drive shaft 10 to the rotary tool 8 mounted on the lower stage tool mounting portion 6, as well as an upper stage power transmission mechanism 30 for transmitting the rotation of the tool-rotating drive shaft to the rotary tool 8 mounted on the upper stage tool-mounting portion 6.

The lower stage power transmission mechanism 20 has a bevel gear 21 as an input portion fixed to the tool-rotating drive shaft 10. The bevel gear 21 has a key 22c disposed in a shaft-side key groove 22a formed on the outer peripheral surface of the tool-rotating drive shaft 10 and a gear-side key groove 22b provided in the bevel gear 21, so that the bevel gear is fixed relative to the tool-rotating drive shaft 10 and is rotated together with the tool-rotating drive shaft 10. The bevel gear 21 is not limited to the configuration described above. Various configurations may be adopted as long as the bevel gear 21 can be fixed in a state where it is prevented from rotation relative to the tool rotating drive shaft 10, such as, a configuration where the bevel gear 21 is prevented from rotation relative to the tool rotating drive shaft 10 by a spline engagement of the inner peripheral surface of the bevel gear 21 with a spline provided on the outer peripheral surface of the tool-rotating drive shaft 10.

The power transmission mechanism 20 includes a lower-stage tool-rotating transmission shaft 23 that is rotatably supported on the fixed body 12 by a bearing. The tool-rotating transmission shaft 23 has a base end that protrudes into the fixed body 12, and a bevel gear 24 is fixed to the base end. The bevel gear 24 is meshed with the bevel gear 21 fixed to the tool-rotating drive shaft 10, and the tool-rotating transmission shaft 23 is adapted to be driven in rotation by the bevel gear 21 that rotates together with the tool-rotating drive shaft 10.

The tool-rotating transmission shaft 23 is arranged coaxially with the rotary tool 8 mounted on the lower-tool mounting portion 6 at the index position. At the tip end of the tool-rotating transmission shaft 23 facing the tool mounting portion 6, there is provided a mortise 23a as an engaging portion extending along the radial direction. The mortise 23a is directed in a direction along the turning direction of the turret 4 when the tool-rotating transmission shaft 23 is stopped at a position where the predetermined rotation phase is achieved by a tool-rotating motor capable of phase control of the stop position. By rotating the turret 4 with the ridge groove 23a directed in the direction along the turning direction of the turret 4, the tenon 8c of the rotary tool 8 mounted on the lower stage tool-mounting portion 6, which has moved toward the index position, can be slidably engaged with the mortise 23a. By causing the tenon 8c of the rotary tool 8, which has moved to the index position, to engage with the mortise 23a, the rotation of the tool-rotating transmission shaft 23 can be transmitted to the rotary tool 8. When the lower stage rotary tool 8 is at a position other than the index position, the tenon 8c does not engage with the mortise 23a, and the rotation of the tool-rotating transmission shaft 23 is not transmitted to the rotary tool 8. A clutch mechanism for interrupting power transmission between the rotary tool 8 and the tool-rotating transmission shaft 23 is constituted by the tenon 8c and the mortise 23a.

The upper stage power transmission mechanism 30 has a bevel gear 31 as an input portion fixed to the tool-rotating drive shaft 10. The bevel gear 31 is fixed to the tool-rotating drive shaft 10 with a fixing means 40 that is comprised of an adjustment means and rotates together with the tool-rotating drive shaft 10. The details of the structure for fixing the bevel gear 31 to the tool-rotating drive shaft 10 with the fixing means 40 will be described later.

The power transmission mechanism 30 includes an upper stage tool rotating transmission shaft 33 that is disposed in parallel with the lower stage tool rotating transmission shaft 23 that, in turn, is rotatably supported by the fixed body 12 by bearings. The base end of the tool-rotating transmission shaft 33 protrudes into the stationary body 12, and a bevel gear 34 is fixed to the base end. The bevel gear 34 is meshed with the bevel gear 31 fixed to the tool-rotating drive shaft 10, and the tool-rotating transmission shaft 33 is adapted to be driven in rotation by the bevel gear 31 that rotates together with the tool-rotating drive shaft 10.

The tool-rotating transmission shaft 33 is arranged coaxially with the rotary tool 8 mounted on the upper stage tool-mounting portion 6 at the index position. At the tip end of the tool-rotating transmission shaft 33 facing the tool mounting portion 6, there is provided a mortise 33a as an engaging portion extending along the radial direction. The mortise 33a is directed in a direction along the turning direction of the turret 4 when the tool-rotating transmission shaft 33 is stopped at a position where a predetermined rotation phase is achieved by a tool-rotating motor capable of phase control of the stop position. By rotating the turret 4 with the mortise 33a directed in the direction along the turning direction of the turret 4, the tenon 8c of the upper stage rotary tool 8 moved toward the index position ca be slidingly engaged into the mortise 33a. The rotation of the tool-rotating transmission shaft 33 can be transmitted to the rotary tool 8 by the engagement of the tenon 8c of the rotary tool 8 moved to the indexing position with the mortise 33a. When the upper stage rotary tool 8 is at a position other than the index position, the tenon 8c does not engage with the mortise 33a and the rotary tool 8 is in a state where the rotation of the tool-rotating transmission shaft 33 is not transmitted. A clutch mechanism for interrupting power transmission between the rotary tool 8 and the tool-rotating transmission shaft 33 is comprised of the tenon 8c and the mortise 33a.

Although not shown in detail, in a portion of the outer peripheral surface of the fixed body 12 corresponding to the lower stage tool-mounting portion 6 and the upper stage tool-mounting portion 6, there may be provided with a circumferential groove that is contiguous with the mortises 23a, 33a with the posture facing the direction along the turning direction of the turret 4. When a circumferential groove is provided on the outer peripheral surface of the stationary body 12, the tenon 8c in a position other than the index position may be engaged with the circumferential groove, such that the tenon 8c ca be positively maintained also in a posture along the turning direction of the turret 4 and moved to the index position with that posture to positively engage the tenon 8 c into the mortises 23a and 33a of the tool-rotating transmission shafts 23 and 33.

The fixing means 40 for fixing the upper stage bevel gear 31 to the tool-rotating drive shaft 10 is adapted to fix the bevel gear 31 to the tool-rotating drive shaft 10 at an arbitrary circumferential position. As the fixing means 40, for example, there may be used the one with a constitution as illustrated in FIG. 3.

Figure 3:
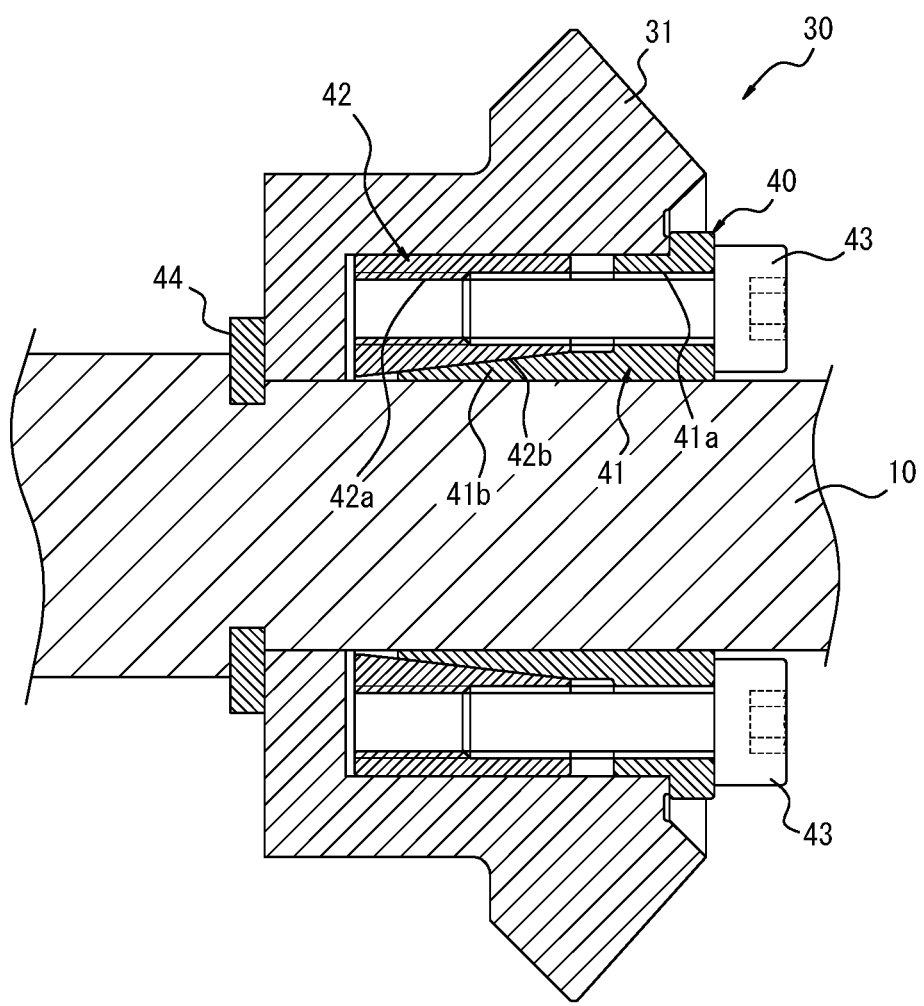
FIG. 3 is a sectional view illustrating the detail of the fixing means illustrated in FIG. 1.

The fixing means 40 illustrated in FIG. 3 includes an inner ring 41 that is formed of a substantially cylindrical steel material having a C-shaped cross section when viewed in the axial direction of the tool-rotating drive shaft 10, and an outer ring 42 which is formed of a substantially cylindrical steel material that can be deformed to expand its diameter. The inner ring 41 is provided with a plurality of through-holes 41a arranged at equal intervals in the circumferential direction, and bolts 43 inserted through these through-holes 41a are screw-connected to threaded holes 42a provided in the outer ring 42. The inner ring 41 has a tapered cylindrical portion 41b with a tapered outer peripheral surface, and a tapered surface 42b provided on the inner peripheral surface of the outer ring 42 is in contact with the outer peripheral surface of the tapered cylindrical portion 41b. The portions other than the tapered surface 42b of the outer ring 42 are spaced apart from the inner ring 41 in the axial direction. Thus, when the bolt 43 is tightened, the outer peripheral surface of the tapered cylindrical portion 41b and the tapered surface 42b are more deeply engaged, thereby deforming the inner ring 41 to contract and also deforming the outer ring 42 to expand.

The fixing means 40 with the constitution as described above is arranged inside the bevel gear 31 and attached to the tool-rotating drive shaft 10. The part of the tool-rotating drive shaft 10 to which the bevel gear 31 is fixed may be a part having a circular outer periphery without a keyway or the like. Before the bolt 43 is tightened, the inner peripheral surface of the inner ring 41 has a slight gap with respect to the outer peripheral surface of the tool-rotating drive shaft 10, such that the bevel gear 31 may be rotated relative to the tool-rotating drive shaft 10, thereby allowing an adjustment to an arbitrary circumferential position. By tightening each bolt 43, the inner ring 41 may be deformed in a reduced diameter between the tool-rotating drive shaft 10 and the bevel gear 31, with the bevel gear 31 at a desired circumferential position with respect to the tool-rotating drive shaft 10, while deforming and expanding the outer ring 42 such that the bevel gear 31 is fixed at this position in a state where it is prevented from rotation with respect to the tool-rotating drive shaft 10. By loosening each bolt 43 again, the bevel gear 31 can be rotated relative to the tool-rotating drive shaft 10 to return to an adjustable state in any circumferential position. Thus, the bevel gear 31 is fixed to the tool-rotating drive shaft 10 by the fixing means 40 after shifting the fixing position of the bevel gear 31 with respect to the tool-rotating drive shaft 10 in the rotation direction with respect to the tool-rotating drive shaft 10. thereby allowing the phase of the engaging portion 23a to be adjusted with respect to the tool-rotating drive shaft 10.

The axial position of the bevel gear 31 is defined by a spacer 44 that is engaged with the tool-rotating drive shaft 10.

When a plurality of tool-mounting portions 6 are provided around the turret 4 separately in a lower stage and an upper stage arranged side by side in the axial direction of the turret-turning shaft 3, and a lower stage power transmission mechanism 20 with the above-described clutch mechanism and the upper stage power transmission mechanism 30 are provided corresponding to the tool mounting section 6 of each stage, in order that the mortises 23a, 33a are simultaneously engaged with the corresponding tenon 8c, it would be necessary to ensure that the rotation phase of the tool-rotating transmission shaft 23 of the lower stage power transmission mechanism 20 and the rotation phase of the tool-rotating transmission shaft 33 of the upper-stage power transmission mechanism 30 are matched with each other so that, when the turret 4 is turned, the mortises 23a and 33a of each stage are accurately matched in the direction along the turning direction of the turret 4. When there is adopted a structure in which the bevel gear 21 of the lower stage power transmission mechanism 20 and the bevel gear 31 of the upper stage power transmission mechanism 30 are both fixed to the tool-rotating drive shaft 10 by means of the shaft side key groove 22a, the gear side key groove 22b and the key 22c, there may be a case due to problems such as machining accuracy, where the phases of the respective ridge grooves 23a, 33a of each stage are shifted from each other in the rotation direction. In this case, it would be difficult to adjust the phases of the mortises 23a, 33a of each stage so that they are matched with each other in the rotation direction.

In the present embodiment, the lower stage power transmission mechanism 20 including the bevel gear 21 fixed to the tool-rotating drive shaft 10 by means of the shaft side key groove 22a, the gear side key groove 22b and the key 22c is used as a reference, and the bevel gear 31 of the upper stage power transmission mechanism 30 is fixed to the tool-rotating drive shaft 10 by means of the fixing means 40 comprised of the adjusting means that can be fixed to the tool-rotating drive shaft 10 at an arbitrary circumferential position. Therefore, the rotation position of the tool-rotating transmission shaft 33 of the upper stage power transmission mechanism 30 or the mortise 33a has been adjusted so that the rotational phase is matched with that of the tool-rotating transmission shaft 23 of the lower stage power transmission mechanism 20 as a reference, and the rotation position of the fixing means 40 is subsequently adjusted so that the bevel gear 31 is fixed to the tool-rotating drive shaft 10 by tightening the bolts 43 of the fixing means 40, thereby making it possible readily and positively match the phase of the mortises 23a and 33a of each stage. Even if the phases of the mortises 23a, 33a of each stage are shifted in the rotation direction, the bolt 43 of the fixing means 40 is loosened, and the rotation position of the upper stage bevel gear 31 is adjusted relative to the tool-rotating drive shaft 10 such that the phases of the mortises 23a, 33a are matched in the rotation direction and the bevel gear 31 is fixed to the tool-rotating drive shaft 10 again by the fixing means 40, thereby allowing the phases of the mortises 23a, 33a in the rotational direction to be matched in a facilitated manner.

The present disclosure is not limited to the embodiment described above and various modifications may be made without departing from the scope of the invention.

In the embodiment described above, the engaging portions provided in the tool-rotating transmission shafts 23 and 33 are formed as mortises 23a, 33a extending along the radial direction, and the engaged portion provided in the rotary tool 8 is formed as a tenon 8c extending along the radial direction. However, the engaging portions provided in the tool-rotating transmission shafts 23 and 33 may be formed as tenons extending along the radial direction, and the engaged portion provided in the rotary tool 8 may be formed as a mortise extending along the radial direction.

In the embodiment described above, only the bevel gear 31 of the upper stage power transmission mechanism 30 is fixed to the tool-rotating drive shaft 10 by the fixing means 40. However, only the bevel gear 21 of the lower stage power transmission mechanism 20 may be fixed to the tool-rotating drive shaft 10 by the fixing means 40 comprised of the adjustment means, or the bevel gear 21 of the lower stage power transmission mechanism 20 and the bevel gear 31 of the upper stage power transmission mechanism 30 may both be fixed to the tool-rotating drive shaft 10 by the fixing means 40 comprised of the adjusting means.

In the embodiment described above, the turret 4 is provided with a plurality of tool mounting portions 6 divided into two stages, the upper stage and the lower stage. However, a plurality of tool mounting parts 6 may be provided in three or more stages. In this case, all the stage bevel gears other than the reference stage bevel gear may be fixed to the tool-rotating drive shaft 10 by the fixing means 40 comprised of the adjusting means.

In the embodiment described above, the input portions of the respective stages are comprised of the bevel gears 21 and 31, but this is not mandatory. Various configurations can be adopted as long as the tool-rotating drive shaft 10 is fixed to the tool-rotating drive shaft 10 for transmitting the rotation of the tool-rotating drive shaft to the tool-rotating transmission shafts 23, 33.

The fixing means 40 comprised of the adjusting means is not limited to the one having the configuration described above, and other configurations may be adopted as long as and the bevel gear 31 can be fixed at an arbitrary circumferential position with respect to the tool-rotating drive shaft 10 and the phase of the upper tool-rotating transmission shaft 33 or the mortise 33a in the rotation direction can be adjusted relative to the phase of the lower stage tool-rotating transmission shaft 23 or the mortise 23a in the rotation direction as the reference.

The adjusting means is not limited to the one constituting the fixing means 40, and a constitution different from the fixing means 40 may be adopted as long as the tenon 8c can be adjusted in phase relative to the tool-rotating drive shaft 10 to thereby engage the mortises 23a, 33a on the upper and lower stages simultaneously with the tenon 8c.

REFERENCE SIGNS LIST

1 Turret tool rest (tool rest for machine tool)
2 Support stand
3 Turret-turning shaft
3a Gear wheel
4 Turret
4a Turret face
5 Cover
6 Tool-mounting portion
7 Holder
8 Rotary tool
8a Tool main body
8b Shank
8c Tenon (engaged portion)
9 Coupling mechanism
10 Tool-rotating drive shaft
11 Stationary shaft
12 Stationary body
20 Lower stage power transmission mechanism
21 Bevel gear (input portion)
22a Shaft side key groove
22b Gear wheel side key groove
22c Key
23 Tool-rotating transmission shaft
23a Mortise (engaging portion)
24 Bevel gear
30 Upper stage power transmission mechanism
31 Bevel gear (input portion)
33 Tool-rotating transmission shaft
33a Mortise (engaging portion)
34 Bevel gear
40 Fixing means (adjusting means)

41 Inner ring
41a Through-hole
41b Tapered cylinder portion
42 Outer ring
42a Threaded hole
42b Tapered face
43 Bolt
44 Spacer

The invention claimed is:

1. A tool rest for a machine tool, the tool rest comprising:
a first rotary tool;
a second rotary tool;
a rotatably supported tool-rotating drive shaft whose rotation is transmitted to the first rotary tool and to the second rotary tool, the tool-rotating drive shaft having a key groove formed in the outer peripheral surface thereof;
a first input portion consisting of a first gear wheel, the first input portion having a key that is received within the key groove of the tool-rotating drive shaft, the first input portion and the tool-rotating drive shaft being fixed to one another via the key and the key groove such that the first input portion is fixed from rotation relative to the tool-rotating drive shaft;
a second input portion consisting of a second gear wheel and rotatably supported by the tool-rotating drive shaft;
a first engaging portion corresponding to the first input portion and rotatably supported and adapted to be driven in rotation by the first input portion, the first engaging portion for engaging with a first engaged portion of the first rotary tool when a first prescribed angular phase is reached;
a second engaging portion corresponding to the second input portion and rotatably supported and adapted to be driven in rotation by the second input portion, the second engaging portion for engaging with a second engaged portion of the second rotary tool when the prescribed angular phase is reached; and
a fixing means, arranged inside the second input portion and attached to the tool-rotating drive shaft, the fixing means fixing the second input portion with respect to the tool-rotating drive shaft such that a phase of the second engaging portion is adjustable relative to the tool-rotating drive shaft, the phase of the second engaging portion being adjusted by shifting a circumferential position of the second input portion in a rotating direction relative to the tool-rotating drive shaft.

2. The tool rest according to claim 1, further provided with
a rotatable turret for mounting the first rotary tool and the second rotary tool thereon, wherein
the first rotary tool and the second rotary tool are mounted along a turning axis, and wherein
the first rotary tool and the second rotary tool are adapted to be simultaneously indexed and driven for rotation by a prescribed indexing of the turret.

3. The tool rest according to claim 2, wherein
the first engaging portion and the first engaged portion consist of a first mortise and a first tenon, respectively, wherein the first tenon and the first mortise are engageable by the prescribed indexing of the turret; and
wherein the second engaging portion and the second engaged portion consist of a second mortise and a second tenon, respectively, wherein the second tenon and the second mortise are engageable by the prescribed indexing of the turret.

4. The tool rest according to claim 1, wherein
the first engaging portion and the first engaged portion consist of a first mortise and a first tenon, respectively, wherein the first tenon and the first mortise are engageable by a prescribed indexing of a turret; and
wherein the second engaging portion and the second engaged portion consist of a second mortise and a second tenon, respectively, wherein the second tenon and the second mortise are engageable by the prescribed indexing of the turret.

* * * * *